United States Patent [19]
Schmitz et al.

[11] Patent Number: 5,917,692
[45] Date of Patent: *Jun. 29, 1999

[54] METHOD OF REDUCING THE IMPACT SPEED OF AN ARMATURE IN AN ELECTROMAGNETIC ACTUATOR

[75] Inventors: Guenter Schmitz; Martin Pischinger, both of Aachen, Germany; Thomas Goebel, Bocholt, Netherlands; Michael Schebitz; Ekkehard Schrey, both of Aachen, Germany

[73] Assignee: Fev Motorentechnik GmbH & Co. Kommanditgesellschaft, Aachen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,553

[22] Filed: Aug. 12, 1996

[30] Foreign Application Priority Data

Aug. 16, 1995 [DE] Germany ............................ 195 30 121

[51] Int. Cl.$^6$ ..................................................... H01H 47/00
[52] U.S. Cl. .............................................................. 361/187
[58] Field of Search ..................................... 361/152, 154, 361/187, 194, 205; 123/490

[56] References Cited

U.S. PATENT DOCUMENTS

| | | | |
|---|---|---|---|
| 4,453,652 | 6/1984 | Menkel et al. | 361/154 |
| 4,970,622 | 11/1990 | Büchl | 361/154 |
| 5,245,501 | 9/1993 | Locher et al. | 361/154 |
| 5,442,515 | 8/1995 | Wallaert | 361/187 |
| 5,546,268 | 8/1996 | Hurley et al. | 361/154 |

FOREIGN PATENT DOCUMENTS

WO 90/07188   6/1990   WIPO ............................ H01H 47/02

*Primary Examiner*—Ronald W. Leja
*Attorney, Agent, or Firm*—Venable; Robert Kinberg; Michael A. Sartori

[57] ABSTRACT

A method is provided for reducing an impact speed of an armature on a pole face of an electromagnet in an electromagnetic actuator, in which the armature moves toward the pole face against a restoring spring force when the coil of the electromagnet is charged with current. The method includes limiting a voltage applied to the coil to a predeterminable maximum value as the armature approaches the pole face so that a current flowing through the coil drops for a portion of the time of the voltage limitation.

20 Claims, 9 Drawing Sheets

— 1 —
METHOD OF REDUCING THE IMPACT SPEED OF AN ARMATURE IN AN ELECTROMAGNETIC ACTUATOR

CROSS-REFERENCE TO RELATED APPLICATIONS

This application claims the right of priority of application DE 195 30 121.8 filed in Germany on Aug. 16, 1995, the disclosure of which is incorporated herein by reference.

BACKGROUND OF THE INVENTION

An electromagnetic actuator, in which an armature, connected to a control mechanism to be actuated and moved by an electromagnet, is frequently required to achieve high switching speeds and, at the same time, great switching forces. For example, in a piston-type internal combustion engine, the cylinder valves are respectively actuated by an electromagnetic actuator comprising at least one electromagnet having a pole face toward which an armature is attracted counter to the force of at least one restoring spring when the coil of the electromagnet is charged with current. Typically, two electromagnets are provided, between which the armature is moved back and forth and held against the pole face of one or the other of the electromagnets, depending on which electromagnet is actuated. In this instance, one of the electromagnets serves as a closing magnet, by which the cylinder valve is held in a closed position, and the other electromagnet serves as an opening magnet, by which the cylinder valve is held in an open position by the armature. To actuate the cylinder valve, that is, to initiate movement from the closed position into the open position, the holding current is shut off at the closing magnet. Consequently, the holding force of the closing magnet drops under the force of the restoring spring, and the armature begins to move, accelerated by the spring force. After the armature has passed through its resting position, which is predetermined by the restoring springs acting counter to each other, the "flight" of the armature is slowed by the spring force of the restoring spring associated with the opening magnet. To capture and hold the armature in the open position, the opening magnet is charged with current. A problem arising during this "capturing process" is that the coupling of force into the armature, and thus the supply of energy, is still relatively low as long as the armature is far away. However, this is the time at which a substantial acceleration of the armature is desirable. If the armature has already moved close to the pole surface of the opening magnet, it would be desirable in terms of energy, acoustics and wear to slow the movement of the armature at this point in time. The course of movement is reversed in order to close the cylinder valve.

Just as it reaches the vicinity of the pole face, the armature experiences a particularly strongly attracting magnetic force. The counterforce of the restoring spring increases in linear fashion, but the magnetic force increases in approximately quadratic proportion to the reciprocal value of the distance of the armature from the pole face. Moreover, the current through the coil of the capturing electromagnet first increases monotonically by means of its inductive behavior after switch-on, which also causes the electromagnetic force to increase. Therefore, among other reasons, attempts have been made to limit at least the increase in current to a certain value with the use of current regulation, as described in PCT International publication No. WO-90/07188. This has the desired effect within specific limits. In the last phase of the armature's approach toward the pole face, however, this method is more likely to prove disadvantageous. When the armature is at a very small distance from the pole face, the current would normally drop again due to the countervoltage induced by the armature. Depending on the current regulation, the current is maintained at the attained level. Therefore, further-increasing energy is coupled into the system.

SUMMARY OF THE INVENTION

It is an object of the invention to provide a method that effects, on the one hand, a rapid force buildup on the armature, and on the other hand, a reduction in the coupling-in of energy during the last movement phase of the armature.

The above and other objects are accomplished in accordance with the invention by the provision of a method for reducing an impact speed of an armature on a pole face of an electromagnet in an electromagnetic actuator, in which the armature moves toward the pole face against a force of a restoring spring when the coil of the electromagnet is charged with current, comprising: limiting a voltage applied to the coil to a predeterminable maximum value as the armature approaches the pole face so that a current flowing through the coil drops for a portion of the time of the voltage limitation. In the use of the method of the invention for an actuator in order to actuate a cylinder valve in a piston-type internal combustion engine, the respective maximum value of the voltage limitation can either be identical for all operating points of the engine or, depending on the engine operation parameters, for example load and rpm, it can be predetermined by a corresponding engine control. The optimum values necessary for this can be mapped into a corresponding characteristic curve for control, for example. The effect of this method is that, when the maximum voltage value is limited during the approach phase of the armature toward the pole face of the respective capturing electromagnet, the voltage induced by the approaching armature achieves this value, but cannot exceed it because of the predetermined limitation. This causes the current, which was previously held constant, to drop again and remain at a low value until the armature impacts. In this phase, less energy is supplied to the armature corresponding to the reduced current flow, so the armature arrives relatively gently at the pole face and the so-called "rebound" can practically be prevented with an appropriate setup of the voltage limitation.

In accordance with the invention, it is further provided that, at least while the armature is approaching the pole face of the capturing electromagnet, the curve of the current through the coil and/or the curve of the voltage at the coil is or are detected and compared to predetermined current and/or voltage curves, respectively, corresponding to an optimum armature movement and, according to the deviations that may result, the current and/or the voltage is or are regulated. With this procedure, the voltage limitation is preferably already predetermined in the design phase such that the armature achieves its optimum path over time. The resulting current curve is determined and preset as the nominal curve. In practical use, the current curve is monitored. If the current curve deviates from the ascertained nominal current curve, deviations in the armature movement can be inferred and correspondingly counter-controlled.

Instead of monitoring the entire current curve, it is also sufficient to monitor certain features of the current curve. For example, the integrated value of the current at a predetermined time can be used as a reference. If this value is less than the value determined in the design phase for an optimum armature approach, this is an indication that the armature is approaching too rapidly. The excessively rapid armature movement induces an excessively high countervoltage, causing the current flow to drop. In this case the voltage is limited at a lower value than would otherwise occur with regular functioning. The magnitude of the change in voltage (reduction or increase) is a function of the difference between the actual value and the predetermined nominal value. The functional connection of the voltage reduction as a function of the value deviation can be determined by a factor or represented by a non-linear function, for example from indicated points of a characteristic curve, in order to attain the optimum effect.

In accordance with the invention, it is further provided that the current flowing through the coil and the voltage at the coil are measured, and the magnitude of the energy supply is derived from the obtained measured values, and the current and/or the voltage is or are regulated by way of a comparison with predetermined values for optimum energy supply. Thus, for example, the supply of kinetic energy into the armature can be inferred at a very early point in time by means of a multiplicative relationship between current and voltage, and a control signal can be derived therefrom in order to change the current or voltage. A more precise result is obtained when the power dissipated through ohmic losses is deducted. The voltage induced by the approach of the armature can, however, be determined without the voltage created by ohmic losses. This is possible, for example, if a measuring coil is integrated into the magnet in addition to the energy supplying coil of the respective electromagnet.

The impact of the armature can be identified with the use of a formula-based linkage of current and voltage, particularly in the case that neither the voltage nor the current is constant over time during the time range of anticipated armature impact. The quotient of voltage and current, which is at its maximum at the time of impact, offers high sensitivity. Here, too, the voltage component caused by ohmic resistance can be deducted using circuitry prior to formation of the quotient, or the voltage of an additional measuring coil is used instead of the voltage at the coil of the electromagnet.

In a further embodiment of the method of the invention, it is provided that an electromagnet is used whose pole face is profiled such that the maximum magnetic saturation, at which the armature has just been captured, is assured when the armature is in contact with the pole face. In a modification of this method, the cross section of the armature can be shaped accordingly instead of or in addition to the profiling of the pole face or the magnet cross section of the electromagnet. With purposeful utilization of the saturation, the magnetic circuit is considerably more saturated when the air gap is small, that is, the armature is extremely close, than when the armature is far away. High saturation, however, leads to the existence of a significantly smaller B-field when the coil current is the same than with low saturation. Because the B-field represents a direct cause of the force, this means less force, that is, less coupling-in of energy. If the cross section of the pole face of the electromagnet and/or the countersurface of the armature is or are selected such that the armature is still "captured" reliably, but possesses no excess movement energy, the impact speed of the armature can also be reduced with this procedure. The profiling of the cross-sections of the electromagnet and/or armature discussed here can be configured, for example, such that the field lines do not bend at a right angle; rather, saturation effects are purposefully avoided by roundings in the armature-magnet.

The invention is described in detail below in conjunction with the accompanying drawings.

BRIEF DESCRIPTION OF THE DRAWINGS

FIG. 2b is a diagram illustrating the curve of the current associated with the voltage of FIG. 2a.

FIG. 4b is a diagram illustrating the curve of the current through the electromagnet associated with the voltage curve of FIG. 4a.

FIG. 5b is a diagram illustrating the curve of the current through the electromagnet associated with the voltage curve of FIG. 5a.

FIG. 6 is a circuit schematic to control the coil voltage according to the method depicted by FIG. 4a.

DETAILED DESCRIPTION OF THE PREFERRED EMBODIMENTS

Figure 1:
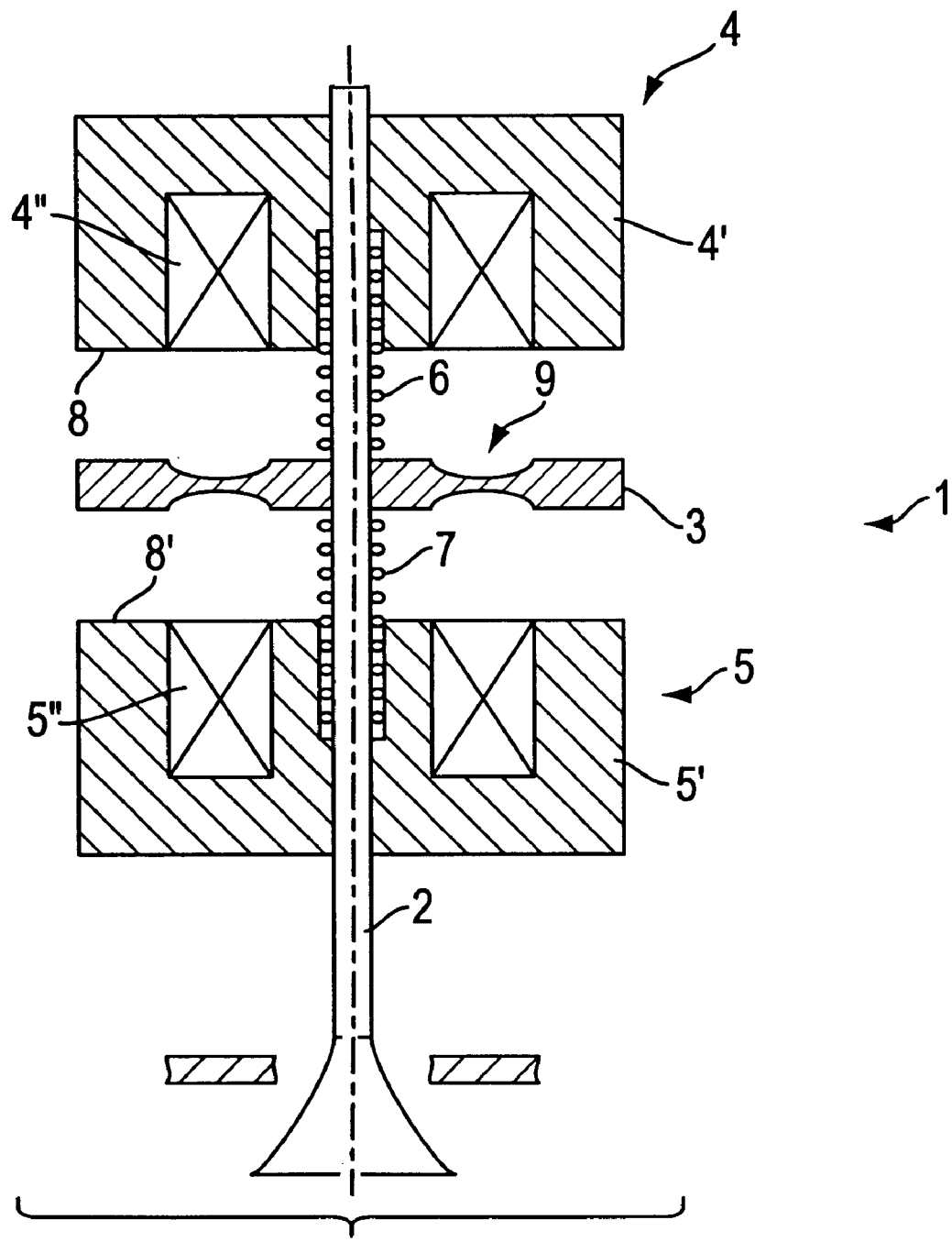
FIG. 1 is a schematic, sectional, side elevational view of an electromagnetic actuator for a cylinder valve with which the method according to the invention may be practiced

Referring to FIG. 1, there is schematically shown an electromagnetic actuator 1 which includes an armature 3 connected to a stem 2 of a cylinder valve (not shown). A closing electromagnet 4 (hereafter the "closing magnet") comprises a core 4' of magnetic material and a coil 4" wrapped around the core, and has a pole face 8. An opening electro-magnet 5 (hereafter the "opening magnet") comprises a core 5' of magnetic material and a coil 5" wrapped around the core, and has a pole face 8'. Restoring springs 6 and 7 are disposed between armature 3 and pole faces 8 and 8', respectively. When the magnets 4 and 5 are both currentless, that is current is turned off at both coils 4" and 5", armature 3 is held by restoring springs 6 and 7 in a resting position between the magnets, with the respective distances from the pole faces 8 and 8' of magnets 4 and 5 being a function of the configuration of springs 6 and 7. In the illustrated embodiment, springs 6 and 7 are configured identically, so the resting position of armature 3 is in the center between pole faces 8 and 8', as shown in FIG. 1. In a closed position of the cylinder valve, armature 3 rests against pole face 8 of closing magnet 4.

To actuate cylinder valve 2, that is, to initiate a movement from the closed position into an open position, the holding current at closing magnet 4 is shut off. Consequently, the holding force of closing magnet 4 drops and armature 3 begins to move, with acceleration being provided by the spring force of restoring spring 6. After armature 3 has passed through its resting position, the "flight" of the armature is slowed by the spring force of restoring spring 7 associated with opening magnet 5. In order to capture armature 3 to place it in the open position and to hold it there, opening magnet 5 is charged with current so that the armature comes to rest against pole face 8' of magnet 5. To close the cylinder valve, the course of switching and movement is effected in the opposite direction.

Figure 2A:
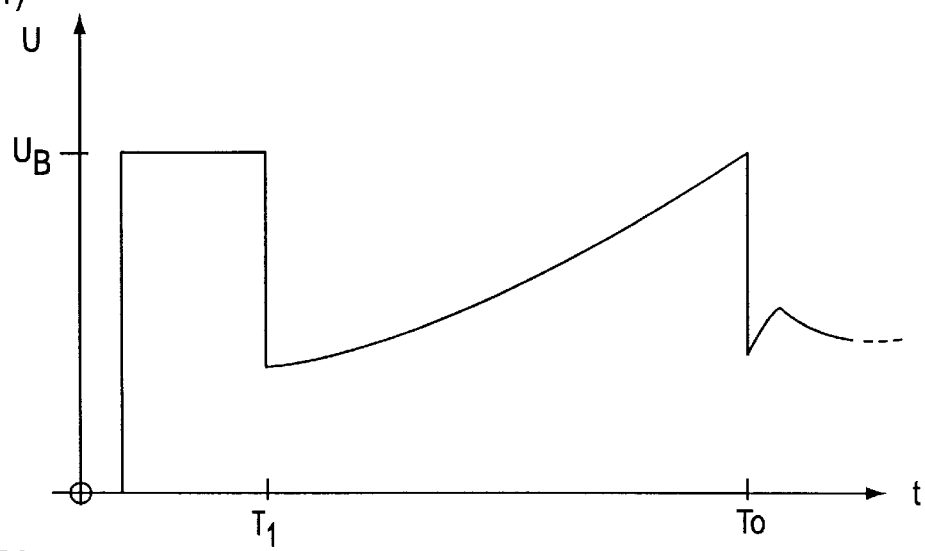
FIG. 2a is a diagram illustrating the curve of the voltage applied to an electromagnet of an electromagnet actuator.
Figure 2B:
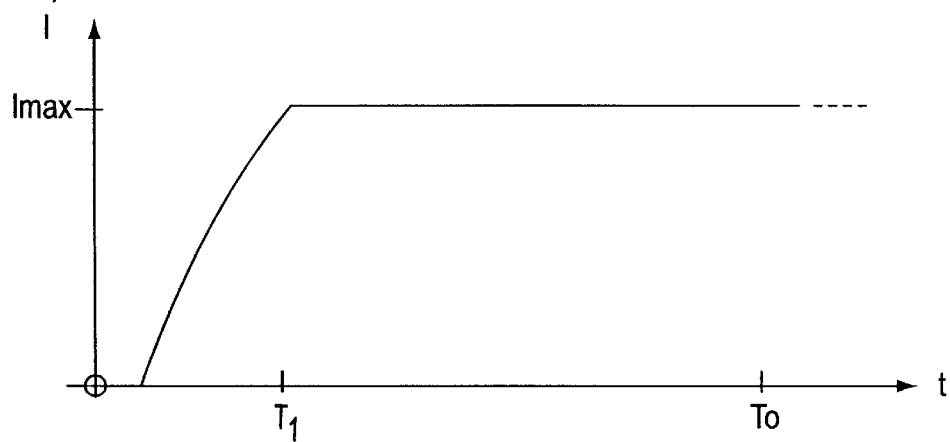
Figure 2C:
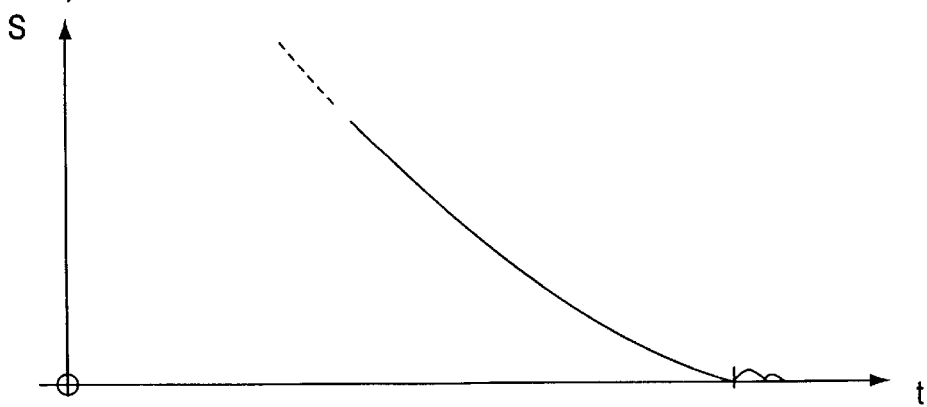
FIG. 2c is a diagram showing the path of the armature of the actuator of FIG. 1 having voltage and current curves according to FIGS. 2a and 2b.

FIG. 2a illustrates the voltage applied to opening magnet 5 according to the prior art. The associated path of the current is shown in FIG. 2b and the associated path of the armature as a function of time is shown in FIG. 2c.

As can be seen in FIG. 2a, the entire supply voltage $U_B$ is first applied to the coil of the capturing magnet. As shown in FIG. 2b, the current I through the coil increases during this time with a steep e-function until the current $I_{max}$ is achieved at $T_1$, and a current regulation is initiated, by means of which the current is maintained at a constant level. This causes the voltage at the coil to drop approximately to the value $R_i I_{max}$, where $R_i$ is the internal resistance of the coil. As dictated by the approaching armature, however, an additional voltage is induced that leads to another increase in the coil voltage. The voltage does not drop again until the armature impacts at time $T_0$. At this time, however, the strongest magnetic force is exerted on the armature, so the "rebound" illustrated in FIG. 2c occurs because the armature impacts the pole face at an excessively high speed and bounces off before reaching final contact.

Figure 3:
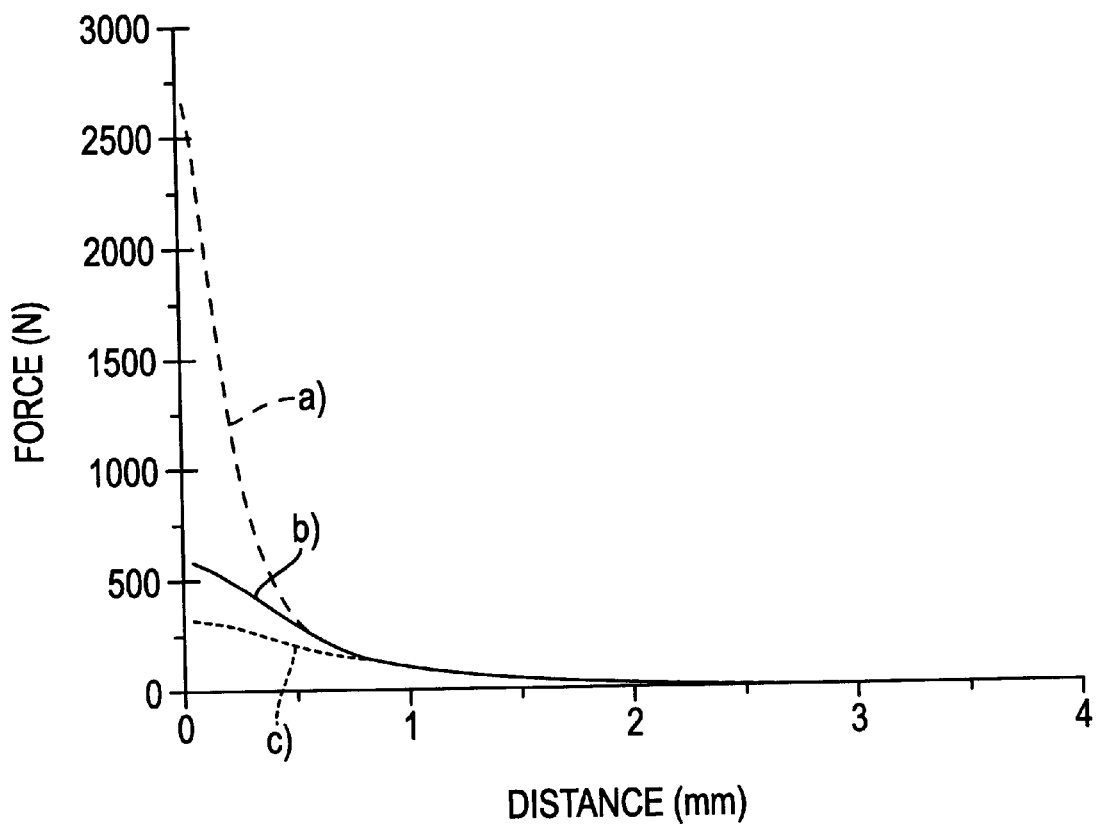
FIG. 3 is a diagram showing respective curves of the magnetic force as a function of the distance of the armature from the pole face resulting from different control methods.

FIG. 3 schematically illustrates the curve of the magnetic force. Curve a) shows a static measurement of the magnetic force as a function of the armature distance when the coil of the capturing electromagnet is charged with a constant current of 4 Amps for a pole face having a cross section of approximately 10 cm². The result is a force curve that approximately corresponds to the theory for unsaturated material, that is, $F \approx 1/d^2$.

Figure 4A:
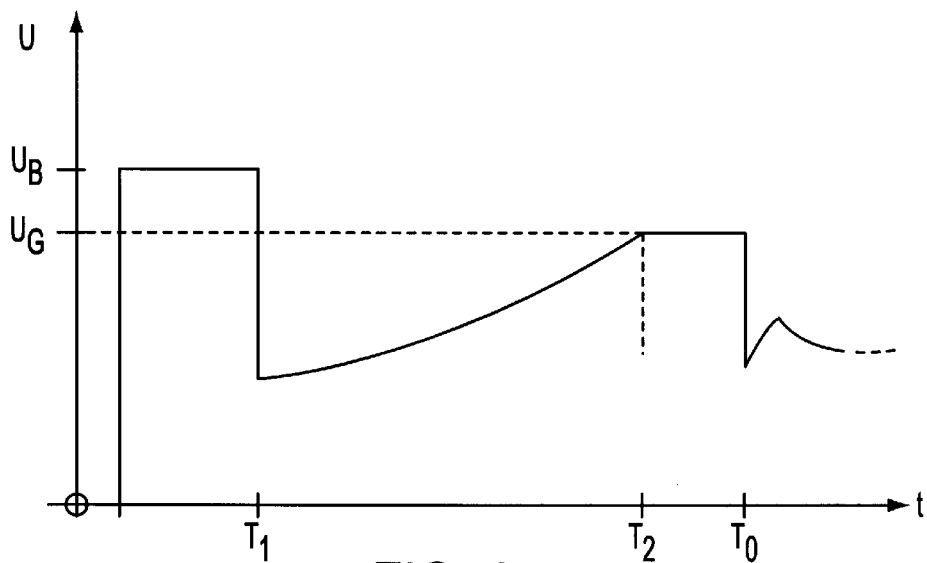
FIG. 4a is a diagram illustrating the curve of the voltage applied to an electromagnet of an electromagnetic actuator according to one embodiment of the invention.
Figure 4B:
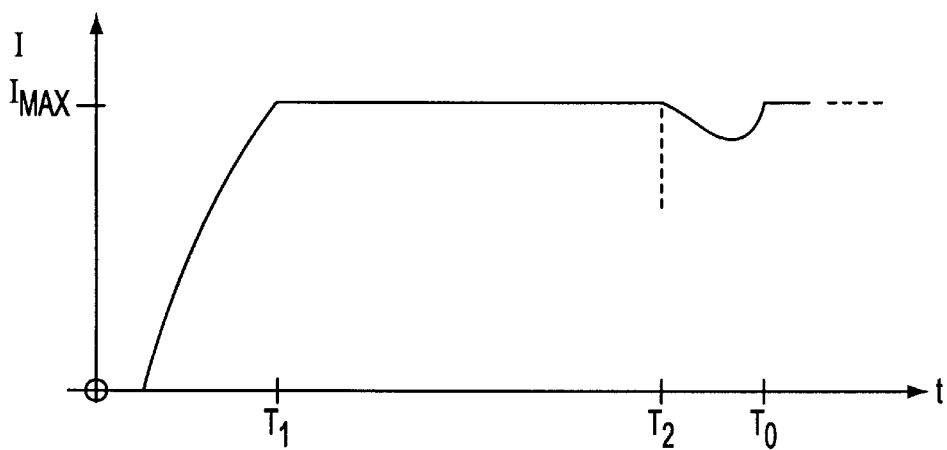
Figure 4C:
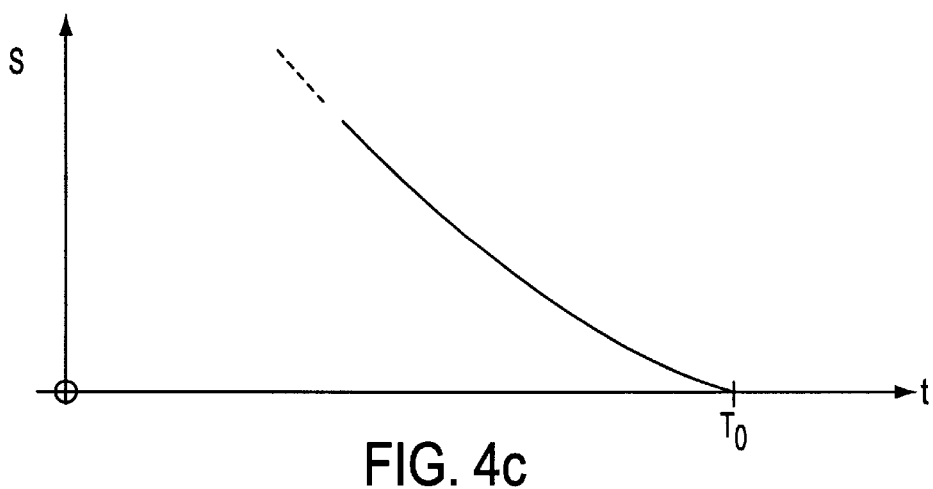
FIG. 4c is a diagram showing the path of the armature of the electromagnet actuator having voltage and current curves according to FIGS. 4a and 4b.

The effect described above can be influenced by a limitation of the voltage at the pole face of the capturing magnet at the time of approach by the armature. This is illustrated in FIGS. 4a–4c in conjunction with the temporal courses of voltage, current and armature path. The voltage and current diagrams of FIGS. 4a and 4b essentially correspond to those of FIGS. 2a and 2b until time $T_1$, that is, until the current is regulated at a constant value during the subsequent constant-current phase.

If the voltage in FIG. 4a is limited to a value $U_G$ following initiation of the current regulation, the value $U_G$ being smaller than the supply voltage $U_B$, the voltage curve will remain the same as in FIG. 2a without any effects up to time $T_2$. At time $T_2$ the coil voltage has reached the limiting value $U_G$ because of the voltage induced by the approaching armature. Consequently, the current, which was previously kept constant, now drops again and, until the impact of the armature at time $T_0$, remains lower than the respective current value according to FIG. 2b. Corresponding to the reduced current flow, less energy is supplied to the armature, so that the armature arrives relatively gently at the pole face, and no rebound is observed in a corresponding configuration, as reflected by the path of the armature illustrated in FIG. 4c.

Figure 5A:
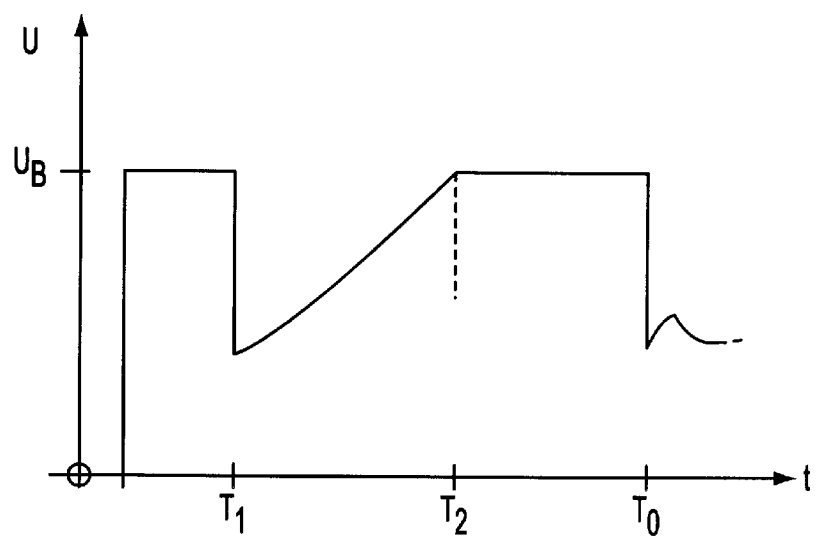
FIG. 5a is a diagram illustrating the curve of the voltage applied to an electromagnet of an electromagnetic actuator.
Figure 5B:
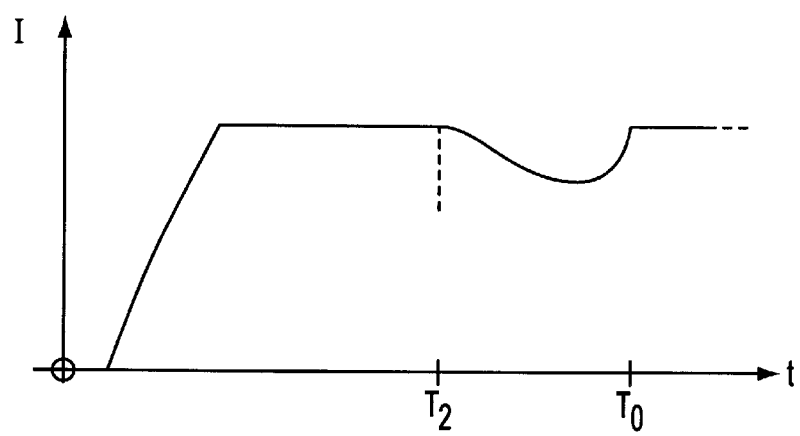
Figure 5C:
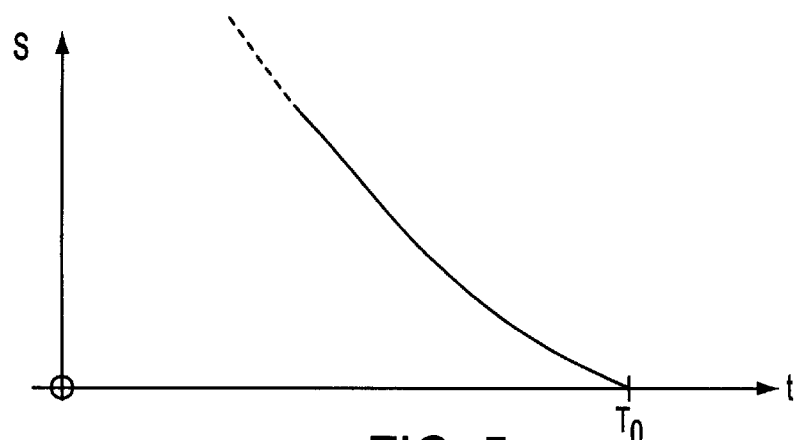
FIG. 5c is a diagram showing the path of the armature of an electromagnetic actuator having voltage and current curves according to FIGS. 5a and 5b.

FIGS. 5a–5c illustrate a modification in the corresponding diagrams for voltage, current and armature path. The voltage limitation according to this modified embodiment is achieved with a dimensioning of the electromagnet coil that differs from that in FIGS. 4a–4c in that the number of coil windings is increased. To achieve the same magnetic flow-through, the maximum current can be reduced for this reason. Until time $T_2$, the paths of voltage and current illustrated in FIGS. 5a and 5b are similar to those in the diagrams in FIGS. 2a and 2b. At time $T_2$, however, the maximum voltage is reached, which corresponds to the supply voltage $U_B$, which again makes it impossible to continue maintaining the current at a constant level. Because of the countervoltage induced by the armature, the current flow also decreases here until the armature has nearly impacted the pole face at time $T_0$. Corresponding to the reduced current flow, less energy is supplied to the armature, so that it arrives relatively gently at the pole face, and no rebound is observed.

In contrast to a limitation of the voltage according to the method described in conjunction with FIGS. 4a–4c, a limitation of the voltage that involves a corresponding dimensioning of the electromagnet components has the advantage that no additional losses result in the control stage because of the linear regulation. The reduced outlay for components is a further advantage.

Unlike a method in which no current regulation takes place during the capturing phase, the described methods have the advantage of being extensively independent of the path of the current increase after switch-on, because as soon as the current regulation is initiated, the current level is not dependent on the coil resistance, the supply voltage or switch-on times of the current, with respect to the beginning of armature movement. This method is therefore also not a function of the time during which the armature sticks to the oppositely-located, releasing electromagnet.

It can also be seen from the above-described diagrams that, in a modification of the methods, the corresponding control and regulating processes can be derived from the curves for the current between times $T_2$ and $T_0$, with the actual curves being compared with a nominal curve predetermined in the design phase for the actuator, for example. This can also be determined by the detection of characteristic individual values of the curves.

Because of the linkage of current and voltage, corresponding corrections can also be derived with isochronic measurement of current and voltage and a subsequent multiplicative linkage of the measured values, because the energy supply and therefore the kinetic energy of the armature can be inferred with this linkage.

As already explained in FIG. 3, by way of the curve of the magnetic force as a function of the gap distance between the armature and the pole face as shown in curve a), measures that permit a reduction in the impact energy of this type of electromagnetic actuator can be taken beforehand in the design phase in addition to the reduction of the energy coupled into the armature by way of "electrical", measures at the time of approach toward the pole face.

For example, if the cross section of the armature selected for the representation of the force curve according to curve a) in FIG. 3 is reduced by approximately half while the current remains unchanged, the result is the force curve represented by curve b). It is apparent that there is practically no difference from curve a) with armature distances of more than 1 mm. With smaller distances, the force increases far less dramatically because of the commencing saturation effects, compared to the case of the large cross section of the armature. The coupling-in of energy to the armature is thus noticeably reduced at the smaller distances.

If the cross section of the armature is further decreased by half, curve c) results, with which the saturation effects are even more pronounced.

If the cross section of the pole face is now selected such that the armature is "captured" reliably under the given operating conditions, but has no excess movement energy, a relatively gentle impact of the armature on the pole face of the capturing magnet can be attained.

This constructive utilization of the saturation effects is also possible with a rather small cross section, which would lead to high saturation under normal circumstances. It is possible to reduce the saturation if the armature and/or the magnetic circuit is or are configured such that the field lines do not bend at a right angle. Instead, saturation effects are achieved by roundings in the armature/magnet. This can be performed on the armature 3, for example, in such a way that its surfaces facing the coils have a rounded-out groove 9 as shown in FIG. 1. The saturation can also be varied with other measures, for example a corresponding selection of material with which the saturation effects commence with higher field intensities if the structural design is the same.

The above-described measures can, of course, also be implemented with an electromagnetic actuator that has only one magnet and is used to move the relevant control member, by way of the armature, from the one end position predetermined by the restoring spring into the other position defined by the contact of the armature with the pole face.

Figure 6:
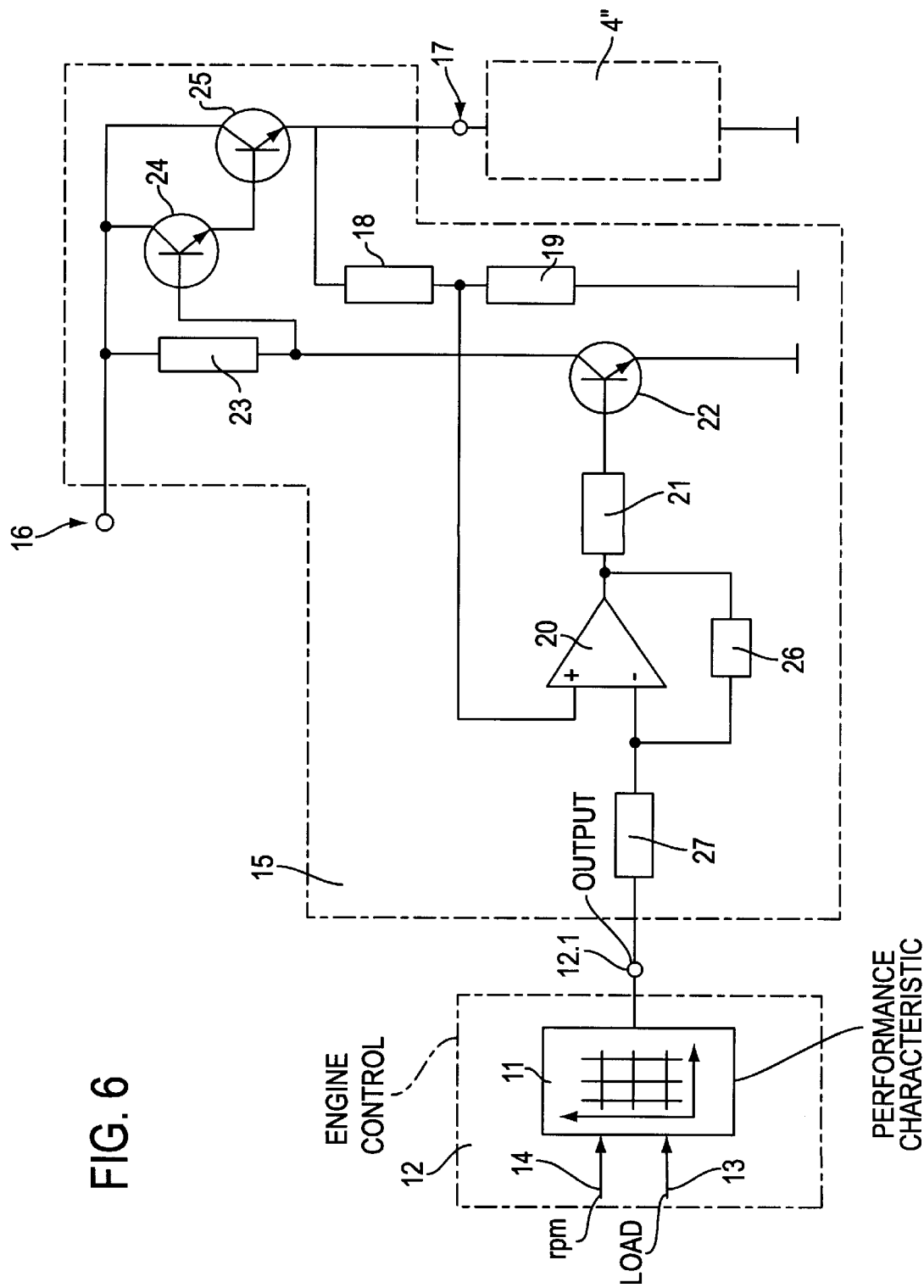

FIG. 6 illustrates a circuit schematic to limit the voltage as a function of the operational engine data according to the method described in connection with FIG. 4a. A performance characteristic 11 of an engine control 12, is used to generate an output signal 12.1, for example, as a function of two input parameter values, such as load 13 and rpm 14. Output signal 12.1, which is scaled by a defined factor r and predetermines the desired voltage, is fed to a voltage limiting circuit 15 that is connected to a high voltage 16 of, for example, 200–300 V. Voltage limiting circuit 15 has an output 17 that forms the voltage supply for the coil 4" or 5" and is thus connected to the respective coil of actuator 1 which is to be controlled, for example, coil 4" or coil 5" and comprises its current control. Voltage output 17 is divided down by the factor r via resistors 18 and 19 (r=R18/R19) and compared to the predetermined desired voltage, which as mentioned has also been reduced by the factor r, in a subsequent operational amplifier stage 20. If the output voltage 17 is larger than the desired voltage, a positive voltage is generated at the output of operational amplifier 20. This positive voltage actuates a transistor 22 via a resistor 21. This causes a current to flow through transistor 22 and through a resistor 23. A voltage drop is thus generated across resistor 23 which reduces the actuation of two transistors 24 and 25 which are connected as a Darlington pair. This lowers the output voltage at point 17. If, on the other hand, output voltage 17 is smaller than the desired voltage, the output of operational amplifier 20 will be low and transistor 22 will be block. As a result, the transistors 24 and 25 are fully actuated, and the voltage at output 17 rises again, namely until it has reached the desired voltage. In this manner, the output voltage 17 is limited to the desired voltage by way of the described closed loop control. Resistors 26 and 27 serve to set the amplification of operational amplifier 20. The Darlington circuit of the transistors 24 and 25 serves to increase the total current amplification of the transistors and may be replaced by a single transistor or may even be supplemented by a further transistor, depending on specific requirements.

Figure 7:
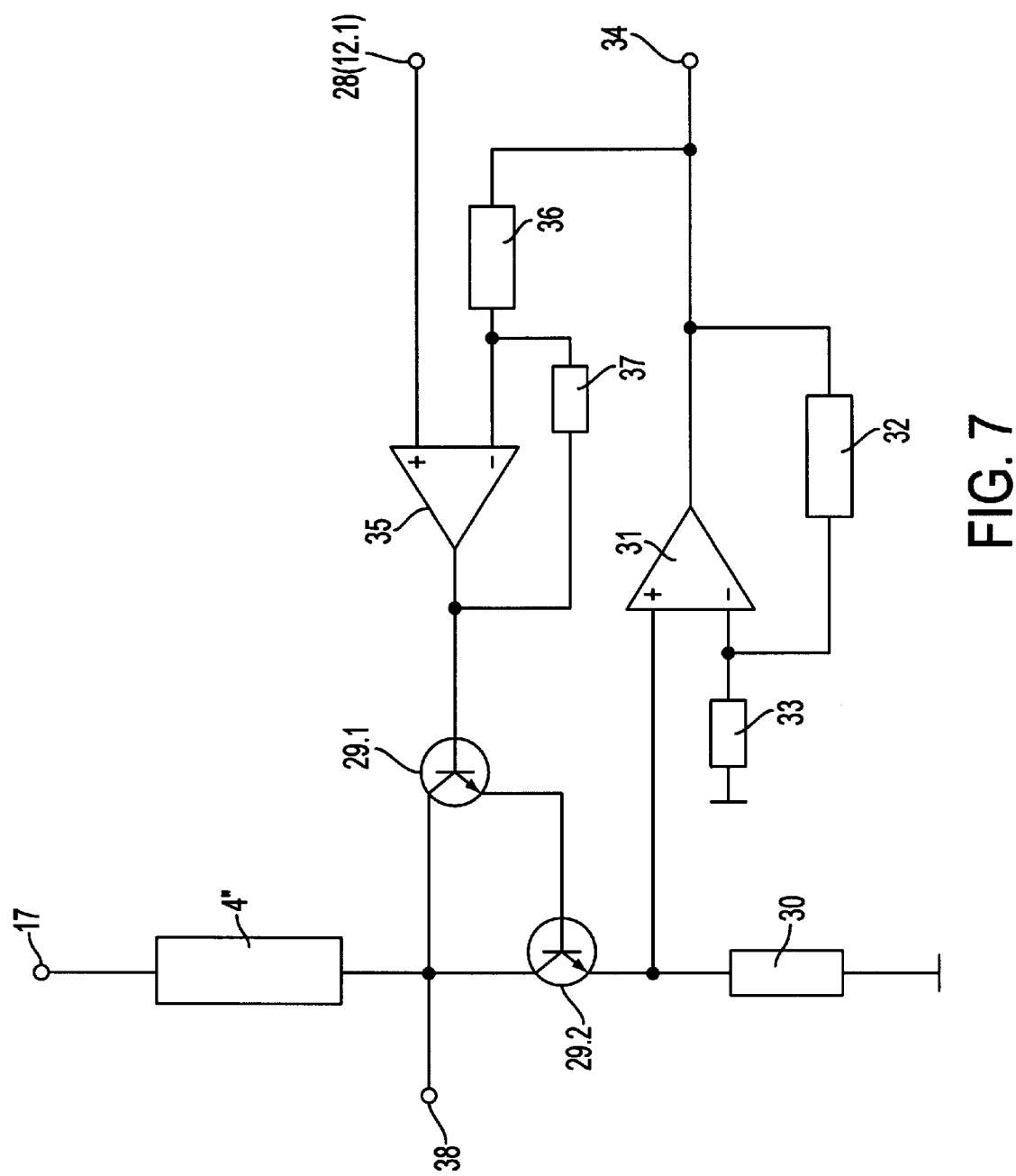
FIG. 7 is a circuit schematic to control the coil current or the coil voltage as a function of a predetermined desired value.

FIG. 7 illustrates a circuit for controlling the current applied to the coil 4" or 5" to a predeterminable desired current value. Here, the desired current value 28 can be taken as output signal 12.1 from a performance characteristic of an engine control, as is illustrated in FIG. 6 for the desired voltage value of the voltage limitation. The level of the current through the actuator or its coil 41" and coil 51" is set by a Darlington circuit comprised of two transistors 29.1 and 29.2. In a measuring resistor 30, which should be very small (typically several 10's to 100 milliohms), a voltage drop is produced that depends on the actual level of the current. This voltage is amplified to a higher voltage value by a measuring amplifier comprising a first operational amplifier 31 and resistors 32 and 33 and is made available as a measured value at a measuring output 34. Thus, for example, a current of 1ampere through measuring resistor 30 results in an output voltage of 1 V by way of the measuring resistor 30 if measuring resistor 30 has a value of 0.1 ohm and the resistors 32 and 33 of operational amplifier 31 have a ratio of 10:1 with respect to one another.

The measured current value is then supplied in the form of a measured voltage 34 to a comparator comprising a second operational amplifier 35 with resistors 36 and 37. If the actual current is below the desired current, the difference of the corresponding voltages 28 and 34 is amplified by a factor s=R37/R36, i. e., the ratio of the two resistors 36 and 37 and forwarded to Darlington transistors 29.1 and 29.2, whereby the transistors are further actuated. The current increases until it has reached the desired value. Here, too, a closed control loop is formed, whose loop amplification can be set via resistors 36 and 37.

In the method according to the invention, the desired current is not fixedly predetermined for the respective operational point and then kept constant over time. Rather, a time profile of the current course can be predetermined which may also depend on measured quantities such as the coil voltage.

Figure 8:
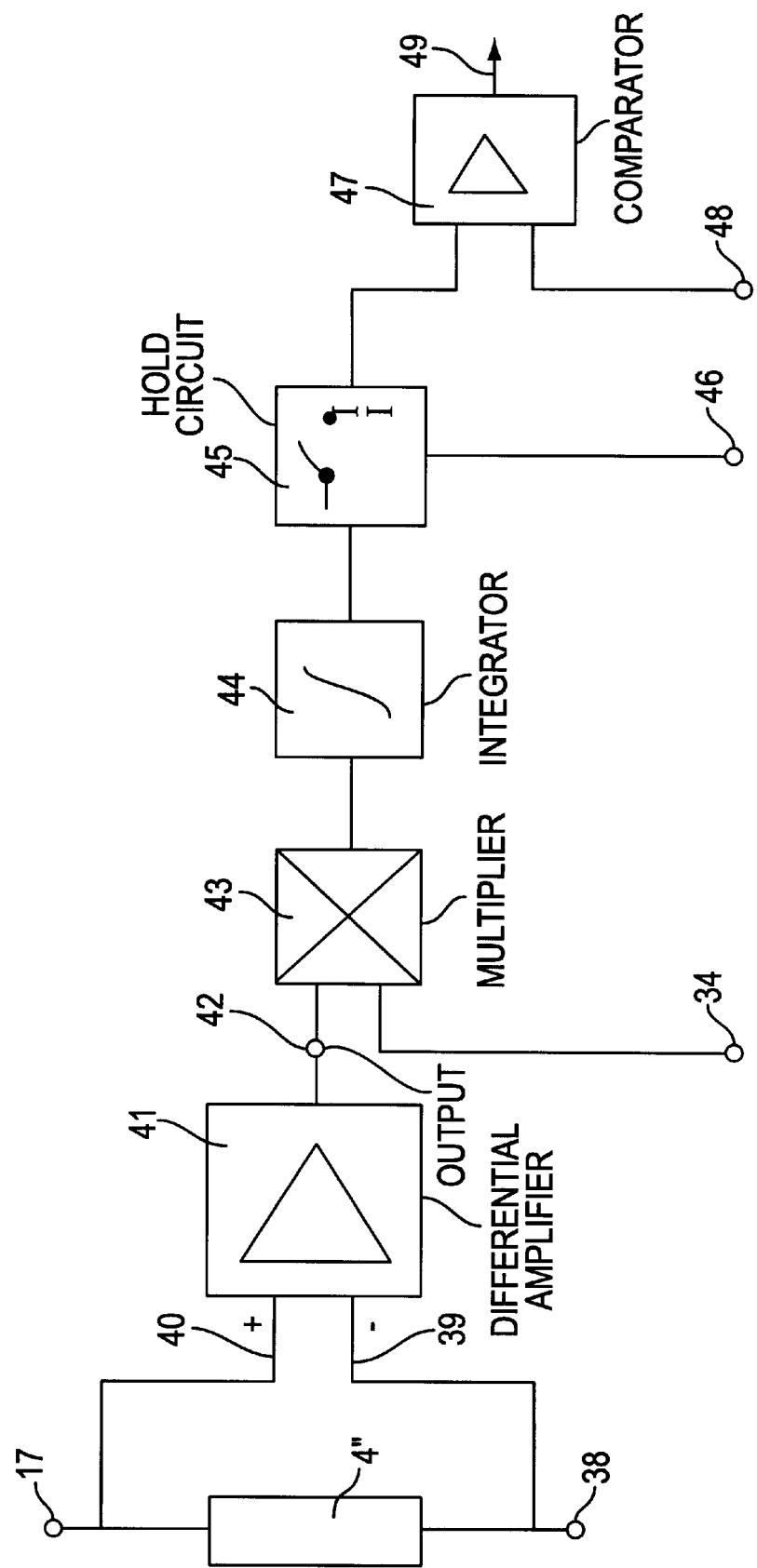
FIG. 8 is a circuit schematic to control the coil voltage as a function of a reference value which is formed from the actual current curve or voltage curve during the approach phase.

A terminal 38 of the circuit of FIG. 7 is illustrated to explain the circuit of the coil voltage which is explained below by way of FIG. 8.

FIG. 8 again illustrates coil 4" with its two terminals 17 and 38. The two terminals of the coil 4" are connected, respectively, to an inverted input 39 and a non-inverted input 40 of a differential amplifier 41 so that the voltage of the coil can be taken from output 42 of differential amplifier 41. This voltage is now available, for example, for a multiplicative linkage with an actual current value which can be tapped, for example, at point 34 from the circuit shown in FIG. 7, if the optimum movement of the armature is to be controlled via the voltage.

The multiplicative linkage takes place in a multiplier 43. The magnitude thus obtained for the power that is supplied to the coil at this time can be integrated up to the total energy supplied with the assistance of an integrator 44. The value of the energy is sampled, in a sample and hold circuit 45, at a time which is predeterminable by the engine control via a signal 46 and, compared in a comparator 47 with the reference value 48 which stems from the engine control, for example, from a reference characteristic. In the event of a deviation, an output signal 49 is generated so that the value for the desired voltage value at output 12.1 of the engine control (FIG. 6) can be added up by way of an adder. Since such adding circuits are well known, a representation in the drawing is dispensed with in this context.

Such an adding and subtracting circuit may also be connected between differential amplifier 41 and multiplier 43 in order to thus adjust the power by the ohmic losses by way of subtracting the current value 34.

Figure 9:
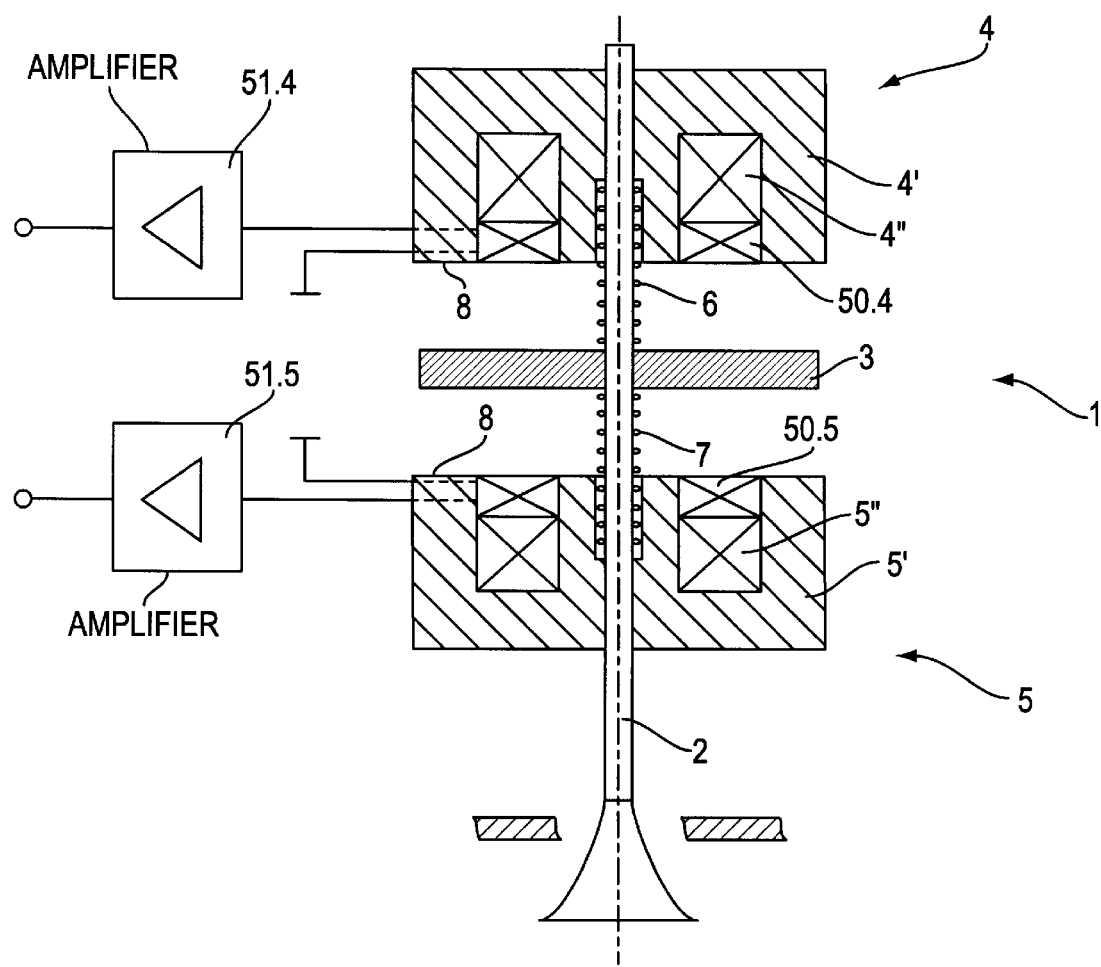
FIG. 9 is a circuit schematic and side elevational view of another embodiment of an electromagnetic actuator with an additional measuring coil.

Referring to FIG. 9, instead of this measure, a separate measuring coil can be used whose signal is not skewed from the outset by the ohmic losses. In addition to the actual power-supplying coils 4" and 5", measuring coils 50.4 and 50.5 are inserted into the electromagnet. The measuring coils 50.4 and 50.5 may comprise a considerably thinner wire cross section than the actuator coils 4" and 5". The measuring coil 50.4 (or 50.5) is then guided to input 42 of multiplier 43 via an amplifier 51.4 (51.5) or even directly without amplification in a circuit according to FIG. 8. The differential amplifier 41 can then be dispensed with.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for reducing an impact speed of an armature on a pole face of an electromagnet in an electromagnetic actuator, in which the armature moves toward the pole face against a force of a restoring spring when a coil of the electromagnet is charged with a current, comprising:

limiting a voltage applied to the coil to a predeterminable maximum value when the armature approaches the pole face so that due to a voltage additionally induced across the coil in the last phase of armature approach to the pole face the current flowing through the coil drops for a portion of the time of the voltage limitation just prior to armature impact.

2. The method according to claim 1, wherein the limiting step is carried out by a voltage control member operatively associated with a system having operating parameters and the limiting step includes predetermining the value of the voltage limitation by the control member as a function of the operating parameters.

3. The method according to claim 2, wherein the system is an internal combustion engine, the armature is connected to a valve stem of a cylinder in the engine, and the value of the voltage limitation is predetermined by the control member as a function of the operating parameters of the engine.

4. The method according to claim 2, wherein the limiting step includes predetermining the value of the voltage limitation according to at least one characteristic diagram associated with the control member.

5. The method according to claim 1, wherein the limiting step includes detecting the current in the coil at least as the armature approaches the pole face of the electromagnet; comparing the detected current with a predetermined curve of the current that corresponds to an optimum armature movement; and regulating the current in the coil according to deviations in current from the predetermined curve of current.

6. The method according to claim 1, wherein the limiting step includes detecting the voltage at the coil at least as the armature approaches the pole face of the electromagnet; comparing the detected voltage with a predetermined curve of the voltage that corresponds to an optimum armature movement; and regulating the voltage applied to the coil according to deviations in voltage from the predetermined curve of voltage.

7. The method according to claim 1, wherein the limiting step includes detecting the current in the coil at least as the armature approaches the pole face of the electromagnet; forming a reference value from the detected current, comparing the reference value with a predetermined reference value; and regulating the voltage applied to the coil according to deviations of the reference value from the predetermined reference value.

8. The method according to claim 1, wherein the limiting step includes detecting the voltage at the coil at least as the armature approaches the pole face of the electromagnet; forming a reference value from the detected voltage; comparing the reference value with a predetermined reference value; and regulating the voltage applied to the coil according to deviation of the reference value from the predetermined reference value.

9. The method according to claim 5, wherein the limiting step further includes measuring the current flowing though the coil and the voltage applied to the coil; deriving an energy supply magnitude from the measured values of current and voltage; and regulating at least one of the current and the voltage based on a comparison of the energy supply magnitude with predeterminable values for an optimum energy supply.

10. The method according to claim 1, further including using an additional measuring coil for detecting a change in voltage induced by the armature.

11. The method according to claim 7, further including profiling at least one of a cross section of the electromagnet and a cross section of the armature so that, when the armature rests against the pole face of the electromagnet, the maximum magnetic saturation is assured, with which the armature is reliably captured by the electromagnet.

12. The method according to claim 8, wherein the voltage applied to the coil is furnished by a voltage source having a supply voltage, and further including dimensioning the coil of the electromagnet so that the predeterminable maximum value of the voltage corresponds to the supply voltage.

13. An electromagnetic actuator comprising:

an armature having a face;

an electromagnet having a coil and a pole face opposite the face of said armature;

a restoring spring coupled to said armature for applying a force against said armature when the face of said armature moves towards the pole face of said electromagnet;

a circuit for applying a voltage and a current to the coil of said electromagnet to move the face of said armature toward the pole face of said electromagnet; and a limiting circuit for limiting the voltage applied to said coil to a maximum value when the face of said armature approaches the pole face of said electromagnet, such that due to a voltage additionally induced across said coil during a final approach of the face of said armature towards the pole face of said electromagnet, the current flowing through said coil decreases for a portion of time just prior to armature impact, thereby reducing an impact speed of the face of said armature on the pole face of said electromagnet.

14. The electromagnetic actuator of claim 13, wherein the maximum value used by said limiting circuit is predetermined.

15. The electromagnetic actuator of claim 13, wherein said limiting circuit regulates the current in said coil according to deviations in current from a predetermined optimum current curve.

16. The electromagnetic actuator of claim 13, wherein said limiting circuit regulates the voltage in said coil according to deviations in voltage from a predetermined optimum voltage curve.

17. The electromagnetic actuator of claim 13, wherein said limiting circuit regulates the current in said coil according to deviations in current from a predetermined current reference value.

18. The electromagnetic actuator of claim 13, wherein said limiting circuit regulates the voltage in said coil according to deviations in voltage from a predetermined voltage reference value.

19. The electromagnetic actuator of claim 13, wherein said electromagnet further comprises a measuring coil for measuring at least one of the voltage and current of said coil.

20. The electromagnetic actuator of claim 13, wherein said armature includes a groove on the face of said armature.

* * * * *